United States Patent
Nagai et al.

[11] Patent Number: 5,879,040
[45] Date of Patent: Mar. 9, 1999

[54] WORKPIECE ATTRACTING DEVICE

[75] Inventors: Shigekazu Nagai, Tokyo; Masayoshi Yamamoto, Koshigaya, both of Japan

[73] Assignee: SMC Kabushiki Kaisha, Tokyo, Japan

[21] Appl. No.: 984,168

[22] Filed: Dec. 3, 1997

[30] Foreign Application Priority Data

Dec. 3, 1996 [JP] Japan .................................. 8-323136

[51] Int. Cl.⁶ ........................... B25J 15/06; B66C 1/02
[52] U.S. Cl. .............................. 294/65; 294/64.1; 901/40
[58] Field of Search .................. 294/64.1–65; 901/40; 414/627, 737, 752; 269/21, 22; 271/90, 91, 107

[56] References Cited

U.S. PATENT DOCUMENTS

| | | | |
|---|---|---|---|
| 2,798,757 | 7/1957 | Jackson | 294/64.1 |
| 3,013,833 | 12/1961 | Gwin et al. | 294/65 |
| 3,785,691 | 1/1974 | Sperry. | |
| 3,833,230 | 9/1974 | Noll. | |
| 4,749,219 | 6/1988 | Bolle, Jr. et al. | 294/64.1 |
| 4,767,142 | 8/1988 | Takahashi et al. | 294/64.1 |
| 4,768,919 | 9/1988 | Borgman et al. | 901/40 |

FOREIGN PATENT DOCUMENTS

| | | | |
|---|---|---|---|
| 1109152 | 4/1968 | United Kingdom | 294/64.1 |

*Primary Examiner*—Dean Kramer
*Attorney, Agent, or Firm*—Oblon, Spivak, McClelland, Maier & Neustadt, P.C.

[57] ABSTRACT

A workpiece attracting device for attracting a workpiece having a curved surface has planar first and second housings securely coupled to each other by fasteners, and a suction pad made of a synthetic resin material and having a flange sandwiched between the first and second housings, and a bellows disposed in a hole defined in one of the first and second housings, the bellows being elastically deformable against the curved surface of the workpiece.

6 Claims, 5 Drawing Sheets

F I G. 2
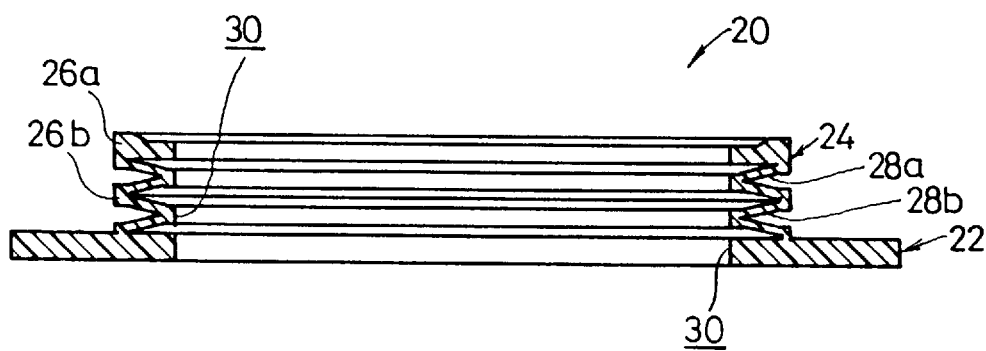

WORKPIECE ATTRACTING DEVICE

BACKGROUND OF THE INVENTION

1. Field of the Invention

The present invention relates to a workpiece attracting device having suction pads for attracting and carrying a workpiece.

2. Description of the Prior Art

Various suction pads have heretofore been used to attract and carry workpieces. One example is a bellows-shaped suction pad for attracting workpieces having a curved surface such as glass plates for liquid crystal display units, CRTs, etc.

FIG. 5 of the accompanying drawings shows a conventional workpiece attracting device having bellows-shaped suction pads. As shown in FIG. 5, the conventional workpiece attracting device, generally denoted at 1, comprises a block 2 having a thickness S, and a plurality of bellows-shaped suction pads 5 mounted respectively in holes 4 in the block 2 by respective attachments 3. The workpiece attracting device 1 serves to attract and carry a glass plate 6 having a curved surface.

The bellows-shaped suction pads 5, which will be brought into direct contact with the glass plate 6, are made of rubber, and each have a suction port 7 which is held in communication with a suction passage 8 defined in the block 2 through the attachment 3.

Since the bellows-shaped suction pads 5 are made of rubber, an oily substance oozing from the bellows-shaped suction pads 5 tends to stick to the surface of the glass plate 6, leaving pad marks on the glass plate 6 which tend to lower the quality of the glass plate 6.

When the glass plate 6 is attracted by the workpiece attracting device 1 immediately after the glass plate 6 is removed from a furnace and hence has a high temperature of about 200° C., the bellows-shaped suction pads 5 that are in contact with the glass plate 6 are subjected to a chemical reaction and generate gases which are liable to adversely affect the surrounding environment.

Furthermore, the thickness S of the workpiece attracting device 1 is relatively large, causing the workpiece attracting device 1 to take up a relatively large space. Consequently, demands to effectively utilize more space around the workpiece attracting device 1 cannot be met.

SUMMARY OF THE INVENTION

It is a general object of the present invention to provide a workpiece attracting device which will prevent pad marks from being left on a curved surface of a workpiece for thereby permitting the workpiece to keep a good quality level.

A major object of the present invention is to provide a workpiece attracting device which is highly resistant to heat and will not adversely affect the surrounding environment.

Another object of the present invention is to provide a workpiece attracting device which is relatively small in size for effective utilization of more space therearound.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is an enlarged cross-sectional view of a suction pad of the workpiece attracting device shown in FIG. 1;

DETAILED DESCRIPTION OF THE PREFERRED EMBODIMENT

Figure 1:
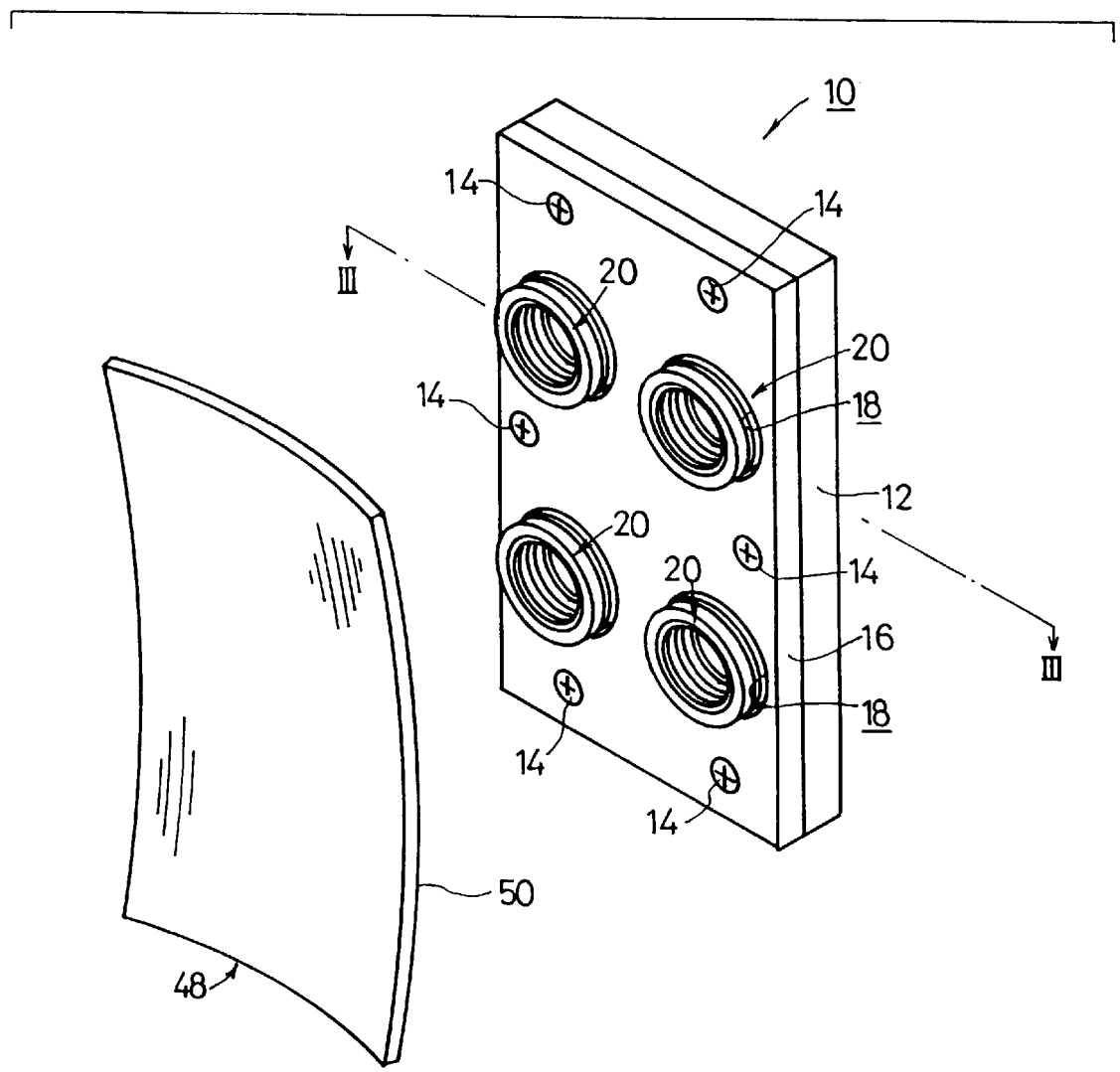
FIG. 1 is a perspective view of a workpiece attracting device according to the present invention.

As shown in FIG. 1, a workpiece attracting device 10 according to the present invention comprises a first housing 12 in the form of an elongate rectangular thin plate, a second housing 16 also in the form of an elongate rectangular thin plate fastened to one side surface of the first housing 12 by a plurality of fasteners such as screws 14, and a plurality of bellows-shaped suction pads 20 disposed respectively in holes 18 defined in the second housing 16. The bellows-shaped suction pads 20 are made of a synthetic resin material such as polytetrafluoroethylene (PTFE) or the like. The first housing 12, the second housing 16, and the screws 14 are preferably made of a synthetic resin material.

As shown in FIG. 2, each of the bellows-shaped suction pads 20 comprises a thick annular flange 22, and a bellows 24 which is integral with, but thinner than the flange 22, and has a diameter smaller than the diameter of the flange 22. The bellows 24 has a plurality of annular ridges 26a, 26b projecting radially outwardly and axially spaced from the flange 22 and also from each other, and a plurality of annular grooves 28a, 28b extending radially inwardly and axially spaced from the flange 22 and each other. The annular groove 28a is axially positioned between the annular ridges 26a, 26b and the annular groove 28a is axially positioned between the annular ridge 26b and the flange 22.

The bellows 24 can be axially expanded and contracted as the ridges 26a, 26b axially move toward and away from the flange 22 and each other across the grooves 28a, 28b. Therefore, the bellows 24 are elastically deformable against a curved surface of a glass plate 48 (see FIG. 1) which is a workpiece attracted and carried by the workpiece attracting device 1. The bellows-shaped suction pad 20 has an axial suction hole 30 extending axially centrally through the flange 22 and the bellows 24.

As shown in FIG. 1, the bellows-shaped suction pads 20 are positioned in the respective holes 18 at respective corners of an elongate rectangular shape. However, the bellows-shaped suction pads 20 may be positioned in any of various different patterns including a square shape, a circular shape, an elliptical shape, a plurality of concentric circular shapes, etc. depending on the curvature of the surface, the weight, and other factors of the workpiece.

In FIG. 2, the bellows 24 has the two ridges 26a, 26b and the two grooves 28a, 28b. However the bellows 24 may have more than two ridges and more than two grooves.

Figure 3:
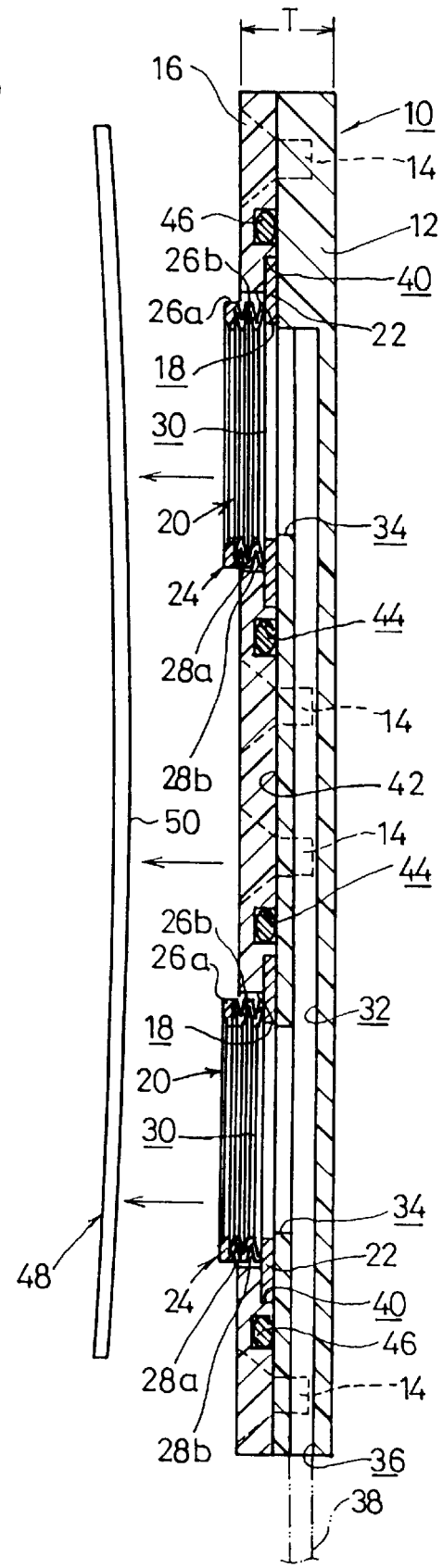
FIG. 3 is an enlarged cross-sectional view taken along line III—III of FIG. 1.

As shown in FIG. 3, each of the bellows-shaped suction pads 20 has an outermost end projecting from an outer flat surface of the second housing 16 by a predetermined distance.

As shown in FIG. 3, the first housing 12 has a suction passage 32 defined therein which extends along the plane of the first housing 12. The suction passage 32 is held in communication with the suction holes 30 of the respective bellows-shaped suction pads 20 through respective openings 34 that are defined in the first housing 12. The suction passage 32 has a connection port 36 in its outer end defined in an edge of the first housing 12. A tube 38 coupled to a vacuum source (not shown) is connected to the connection port 36 through a tube joint (not shown). The second housing 16 has a plurality of recesses 40 defined in a surface thereof facing a surface 42 of the first housing 12 and positioned at the bottoms of the respective holes 18 near the openings 34. The flanges 22 of the respective bellows-shaped suction pads 20 are partly received in the respective recesses 40 and held against the surface 42 of the first housing 12, thereby firmly holding the bellows-shaped suction pads 20 in place.

O-rings (seals) 46 are disposed in respective annular grooves 44 defined in the second housing 16 around the flanges 22. The O-rings 46 are pressed against the surface 42 of the first housing 12 to provide hermetical sealing between the flanges 22 and the surface 42. The O-rings 46 may be separate from or integral with the second housing 16.

The glass plate 48 has a curved surface 50 having a predetermined radius of curvature, as shown in FIG. 1.

Operation and advantages of the workpiece attracting device 10 will be described below.

The workpiece attracting device 10 is first installed on the distal end of an arm of a working robot by an installing device (not shown). Then, the vacuum source connected to the tube 38 is actuated to introduce a fluid under vacuum through the tube 38 into the connection port 36 of the workpiece attracting device 10. It is assumed that the glass plate 48 to be attracted and carried by the workpiece attracting device 10 has just been removed from a furnace by an unloader (not shown) and heated to a high temperature of about 200° C. The glass plate 48 will be processed into a glass plate for use on a liquid crystal display (LCD) unit.

After the above preparatory process, the arm of the working robot is displaced to move the workpiece attracting device 10 three-dimensionally with respect to the glass plate 48, as shown in FIG. 3. More specifically, the glass plate 48 is erected in place with its plane extending vertically by a fixture (not shown), and the workpiece attracting device 10 is displaced by the arm of the working robot into a position in which the workpiece attracting device 10 confronts the curved surface 50 of the glass plate 48.

Then, the workpiece attracting device 10 is displaced horizontally as indicated by the arrows until the bellows-shaped suction pads 20 abut against the curved surface 50 of the glass plate 48. When the bellows-shaped suction pads 20 abut against the curved surface 50 of the glass plate 48, the bellows 24 are elastically deformed against the curved surface 50 with the ridges 26a, 26b moving toward the flange 22 and each other through the grooves 28a, 28b. At this time, the bellows 24 are elastically deformed into different shapes because they are held in contact with different regions of the curved surface 50. The bellows-shaped suction pads 20 now attract the curved surface 50 under the vacuum of the fluid that is supplied from the suction passage 32 through the suction holes 30. Therefore, the bellows-shaped suction pads 20 attract and hold the glass plate 48 while they are being elastically deformed against the curved surface 50 of the glass plate 48, as shown in FIG. 4.

Figure 4:
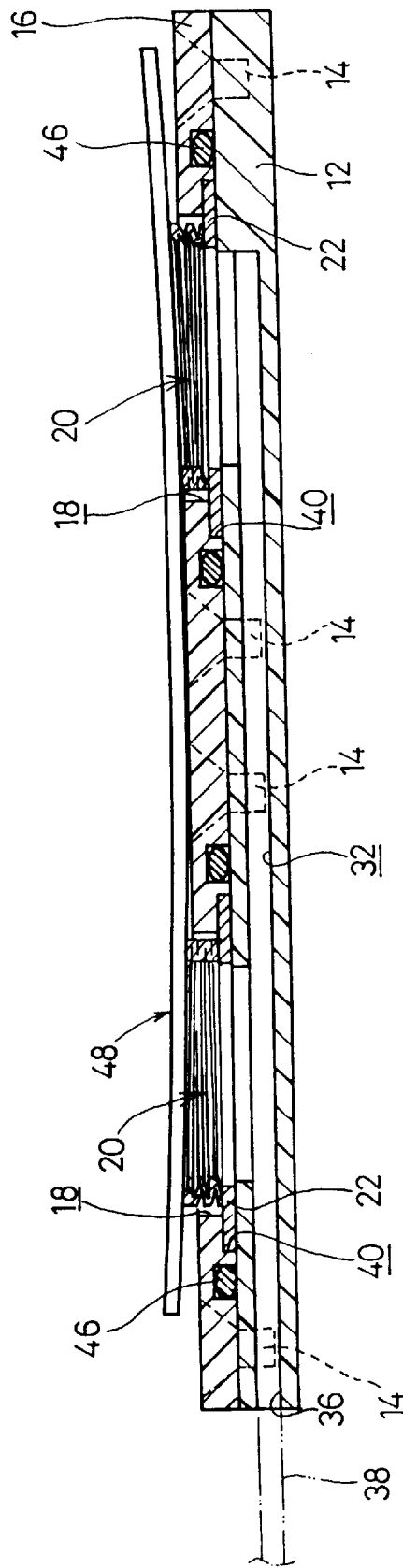
FIG. 4 is an enlarged cross-sectional view showing the manner in which the workpiece attracting device has attracted a workpiece.

Thereafter, the arm of the working robot turns the workpiece attracting device 10 by 90° into a position shown in FIG. 4 in which the glass plate 48 is horizontally supported on the bellows-shaped suction pads 20, and then moves the workpiece attracting device 10 to another location while the workpiece attracting device 10 is continuously holding the glass plate 48. Then, the vacuum source is deactivated to cause the workpiece attracting device 10 to release the glass plate 48 from the bellows-shaped suction pads 20. The glass plate 48 has now been delivered from the furnace to the desired location.

The bellows-shaped suction pads 20 which are made of a synthetic resin material can attract and carry workpieces which are required to keep their high quality, such as glass plates for liquid crystal display units, CRTs, etc., without leaving pad marks on the workpieces which would otherwise be produced by an oily substance oozing from rubber suction pads. Since the synthetic resin material of the bellows-shaped suction pads 20 is polytetrafluoroethylene, for example, which is highly resistance to heat, the bellows-shaped suction pads 20 do not produce gases when they contact workpieces at high temperatures and hence do not adversely affect the surrounding environment.

In the illustrated embodiment, the bellows 24 of the plural bellows-shaped suction pads 20 are capable of reliably attracting and holding the curved surface 50 of the glass plate 48, and hence can prevent the glass plate 48 from being accidentally released while it is being carried. Therefore, the workpiece attracting device 10 can attract and hold workpieces having curved surfaces of different radii of curvature.

Figure 5:
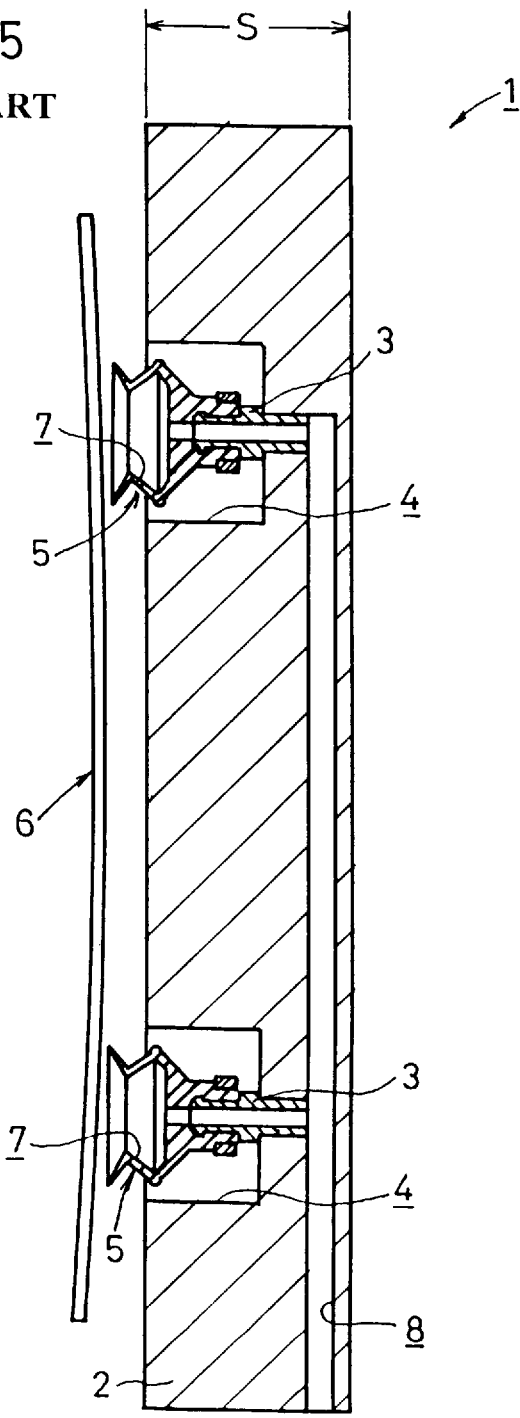
FIG. 5 is a cross-sectional view of a conventional workpiece attracting device.

Since the flanges 22 of the bellows-shaped suction pads 20 are sandwiched between the first and second housings 12, 16, no separate attachments (like the attachments 3 shown in FIG. 5) are needed to secure the bellows-shaped suction pads 20 to the first and second housings 12, 16. Consequently, the workpiece attracting device 10 may have a thickness T (see FIG. 3) that is smaller than the thickness S of the conventional workpiece attracting device 1. The workpiece attracting device 10 is thus relatively small in size for effective utilization of more space therearound.

All the components of the workpiece attracting device 10, including the bellows-shaped suction pads 20, are made of synthetic resin materials. Therefore, even when part of a workpiece accidentally contacts the workpiece attracting device 10 at the time the workpiece attracting device 10 attracts the workpiece, the workpiece will not damaged by the workpiece attracting device 10, but will keep its desired quality level.

Although a certain preferred embodiment of the present invention has been shown and described in detail, it should be understood that various changes and modifications may be made therein without departing from the scope of the appended claims.

What is claimed is:

1. A workpiece attracting device for attracting a workpiece having a curved surface, comprising:

planar first and second housings securely coupled to each other by a plurality of fasteners, one of said first and second housings having a hole defined therein, said fasteners being spaced from and disposed outside of said hole; and a suction pad made of a synthetic resin material, said suction pad further comprising a flange sandwiched between said first and second housings and a bellows disposed in said hole defined in one of said first and second housings, said bellows being elastically deformable when said suction pad is brought into contact with the curved surface of the workpiece;

one of said first and second housings having a suction passage for introducing a fluid under vacuum into said suction pad for attracting and holding the workpiece while said suction pad is being held against the curved surface.

2. A workpiece attracting device according to claim 1, wherein said bellows comprises a plurality of ridges and a plurality of grooves alternating therewith.

3. A workpiece attracting device according to claim 1, wherein said synthetic resin material comprises polytetrafluoroethylene.

4. A workpiece attracting device according to claim 1, wherein said first and second housings are made of a synthetic resin material.

5. A workpiece attracting device for attracting a workpiece having a curved surface, comprising:

planar first and second housings securely coupled to each other by fasteners;

a suction pad made of a synthetic resin material, said suction pad further comprising a flange sandwiched between said first and second housings and a bellows disposed in a hole defined in one of said first and second housings, said bellows being elastically deformable when said suction pad is brought into contact with the curved surface of the workpiece; and a seal disposed near said flange and hermetically sealing said flange sandwiched between said first and second housings;

one of said first and second housings having a suction passage for introducing a fluid under vacuum into said suction pad for attracting and holding the workpiece while said suction pad is being held against the curved surface.

6. A workpiece attracting device for attracting a workpiece having a curved surface, comprising:

planar first and second housings securely coupled to each other by fasteners; and a plurality of substantially identical suction pads, each of said suction pads being made of a synthetic resin material, each of said suction pads further comprising a flange sandwiched between said first and second housings and a bellows disposed in a hole defined in one of said first and second housings, said bellows being elastically deformable when said suction pads are brought into contact with the curved surface of the workpiece;

one of said first and second housings having a suction passage for introducing a fluid under vacuum into said suction pad for attracting and holding the workpiece while said suction pad is being held against the curved surface, wherein said suction pads are positioned in a pattern depending on one of the curvature of said curved surface of the workpiece and the weight of the workpiece.

* * * * *